United States Patent [19]

Hamer

[11] Patent Number: 4,899,378
[45] Date of Patent: Feb. 6, 1990

[54] TELEPHONE ANNOUNCEMENT SYSTEM

[76] Inventor: William C. Hamer, 4709 Upper Ter., Edina, Minn. 55435

[21] Appl. No.: 149,188

[22] Filed: Jan. 27, 1988

[51] Int. Cl.⁴ .............................................. H04M 1/72
[52] U.S. Cl. .................... 379/374; 379/387; 379/388; 379/177
[58] Field of Search ............... 379/374, 387, 388, 389, 379/390, 395, 179, 177, 167, 170, 156, 159, 160, 165

[56] References Cited

U.S. PATENT DOCUMENTS

| | | | |
|---|---|---|---|
| 4,081,614 | 3/1978 | Dahlquist et al. | 379/49 |
| 4,196,317 | 4/1980 | Bartelink | 379/159 |
| 4,311,875 | 1/1982 | Danner | 379/201 |
| 4,377,726 | 3/1983 | Schiffbauer et al. | 379/170 X |
| 4,427,847 | 1/1984 | Hofmann et al. | 379/61 |
| 4,485,273 | 11/1984 | Bartelink | 379/159 |
| 4,578,540 | 3/1986 | Berg et al. | 379/40 |
| 4,588,861 | 5/1986 | Teich | 379/159 |
| 4,636,589 | 1/1987 | Lee | 379/159 |
| 4,642,425 | 2/1987 | Guinn, Jr. et al. | 379/57 |
| 4,672,660 | 6/1987 | Curtin | 379/88 |
| 4,734,932 | 3/1988 | Lott | 379/160 |
| 4,754,479 | 6/1988 | Rasmussen et al. | 379/160 X |
| 4,794,640 | 12/1988 | Yeh | 379/160 |

FOREIGN PATENT DOCUMENTS 0140748 11/1981 Japan ................... 379/160

Primary Examiner—James L. Dwyer

[57] ABSTRACT

A telephone announcement system adaptable to existing two-wire subscriber telephone lines is described. The announcement system is connected between the tip and ring wires of a standard subscriber telephone line and activated in a receive-only announcement mode. The announcement box monitors the telephone line for detecting specific DTMF tones to activate the device. Once activated, the device receives audio information on the telephone line, amplifies it, and broadcasts it on a speaker. The box is deactivated by the same or another DTMF tone. In operation, the subscriber may receive a telephone call, press a specific DTMF tone on the push-button telephone pad and then make the announcement of the telephone call into the handset of the telephone, and the telephone call is then broadcast by the announcement box.

10 Claims, 5 Drawing Sheets

TELEPHONE ANNOUNCEMENT SYSTEM

FIELD OF THE INVENTION

The present invention relates to intercom systems and in particular to an announcement systems utilizing the existing wiring and telephone sets on the premises of a telephone subscriber.

BACKGROUND OF THE INVENTION

Stand-alone intercom systems are known in the prior art and generally operate independent of the telephone system, each unit of which is independently connected through its own wiring system.

Telephone intercom systems using a portion of an existing telephone network are also known in the prior art as an integral feature in business telephone systems such as PBX and key systems. This feature is integral to the business telephone systems, taking advantage of hardware which is not available to non-business telephone systems, such as in a residential environment.

Intercom systems which are usable in residential environments and which do make use of at least some of the existing telephone networks are also known in the prior art. For example, U.S. Pat. No. 4,588,861 to Teich and U.S. Pat. No. 4,196,317 to Bartelink both show intercom systems which work in conjunction with existing telephone networks in a business or residential environment. These prior art intercom systems, however, take advantage of the two extra conductors of a four-conductor wire typically provided on the premises of the telephone subscriber. These extra telephone wires are not always available in all environments, and thus make the prior art intercom systems unusable in some environments.

In applications where simple announcement of incoming telephone calls is required where multiple telephone sets are connected to a single subscriber's line, an intercom system is useful but two-way voice communication is unnecessary. When one of a plurality of telephones on a subscriber's line is answered, a simple announcement is all that is required to call the intended party to pick up one of the other telephones on a subscriber's line.

SUMMARY OF THE INVENTION

The present invention solves the shortcomings of the prior art as described above and has other advantages described below. In particular, the present invention describes a telephone announcement system which is adaptable to existing two-wire subscriber telephone lines connected to standard central office-type telephone systems such as the type found in residential applications. The present invention is an announcement system in which individual announcement boxes are connected at various points along the subscriber's telephone line and are activated in a receive-only announcement mode. The stand alone design of the boxes allow their placement at places independent of the subscriber's telephones. The electrical design of the present invention ensures a high input impedance when connected across the telephone line, allowing for a large number of the units to be placed on any one subscriber's line without undue loading.

In operation, the individual announcement boxes are activated by pressing one of the existing keys on a DTMF touch pad-equipped telephone. All the announcement boxes connected to the subscriber's line are activated upon receiving this DTMF tone. The subscriber then speaks into the handset and the announcement boxes receive and amplify the voice communication from the handset. The boxes are turned off by the striking of a key on the DTMF touch pad. The foregoing operation is completely independent of normal switch hook operation of the subscriber's telephones and uses the existing two-wire pair also used for operation of the telephone system. The announcement system of the present invention may be used whether telephone communications are ongoing or not.

BRIEF DESCRIPTION OF THE DRAWINGS

In the drawings, where like numerals refer to like components throughout the several views.

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural changes may be made without departing from the scope of the present invention.

Figure 1:
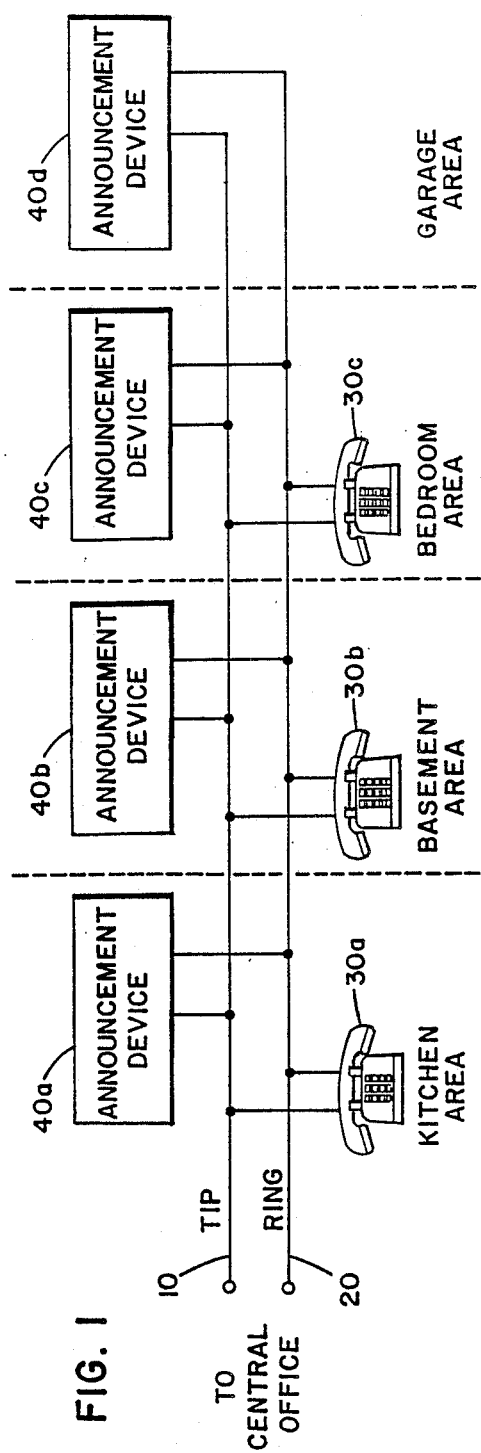
FIG. 1 shows a possible layout of the use of the preferred embodiment of the present invention connected at a plurality of locations at a subscriber's premises.

The typical layout of a subscriber's premises such as a residence is shown in FIG. 1. The tip 10 and ring 20 wires connecting the subscriber's premises to the central office are shown connected to subscriber's telephones 30a, 30b and 30c (hereinafter generally referred to as 30). Also connected in parallel to the subscriber's telephones 30 are the announcement devices 40a, 40b, 40c and 40d (hereinafter generally referred to as 40) which are the subject of the present invention. Announcement device 40 is a speaker/amplifier unit containing electronics which provide telephone announcement capabilities to an existing subscriber line. The announcement device 40 is connected to the telephone line through a standard RJ-11 connector. Each announcement device 40 requires AC power (not shown) via a small UL-approved modular wall transformer. Once connected to the telephone line, the announcement device 40 is activated from any telephone 30 on the line by pressing a star (*) key on the telephone pad. Those skilled in the art will readily recognize that in the alternative the octothorpe (#) key may be used to activate the announcement device. The star key or the octothorpe key can be used in most residential telephone lines at the subscriber's premises since they are currently unused for other applications and generally ignored by the central office switching equipment. The dial-tone is generally removed by the central office switching equipment in response to the receipt of a star or octothorpe key, but these keys cause nothing further to happen unless a subscriber has purchased a special function from the telephone company which is invoked by one of these keys. During an ongoing telephone call, however, the pressing of any key is ignored by the central office switching equipment.

Once activated, the announcement device 40 can be used by any one of the subscriber telephones 30 to announce incoming calls within the premises. Announcement device 40 has a volume control and internal filtering to minimize audio feedback. Announcement device 40 also has a very high line impedance and hence applies very little loading on the telephone line. This minimal loading allows a large number of the announcement units 40 to be connected to a telephone line along with telephones 30.

As shown in FIG. 1, in a house with multiple floors or multiple telephone locations, a possible arrangement would be to place an announcement unit in the vicinity of each phone. For example, the kitchen area may have a telephone 31a and a announcement device 40a connected in proximity thereto. The basement area sometimes has a telephone 30b and could also have an announcement device 40b connected nearby. As a further example, the garage could only have a announcement device 40d, or in the alternative, only a telephone.

Referring to FIG. 1, in operation one of the residents may answer the telephone 30a located in the kitchen area. Realizing that the telephone call was intended for another person, the person answering the phone can press the star button to activate announcement devices 40a, 40b, 40c and 40d throughout the household. The announcement devices would all activate in response to receiving the DTMF tone corresponding to the star key. The person in the kitchen area would then announce the call through the handset of telephones 30a and it would be amplified and distributed throughout the house by announcement devices 40a, 40b, 40c and 40d. The announcement devices can be deactivated by pressing any key other than the star key once, including the octothorpe key or a numeric key. Thus, the announcement device 40 is more selective in its responsiveness to activating tones than in its responsiveness to deactivating tones. The chance of inadvertent activation is thus minimized. The use of the announcement device is transparent to the telephone call and does not interfere with the resumption of the telephone conversation.

In its inactive state, announcement device 40 also does not interfere with the normal operation of the telephone line and the telephones 30 connected thereto. It does not respond to nor is it affected by the numeric keys on the telephone keypad. Thus, ordinary telephone number dialing for outgoing calls will not activate this unit. The unit is unaffected by ringing or other switch hook operation sequences of the telephones. In implementation, as described in more detail below, the preferred embodiment of the present invention complies with the requirements of FCC Rules Part 68 and Underwriters Laboratories.

Figure 2:
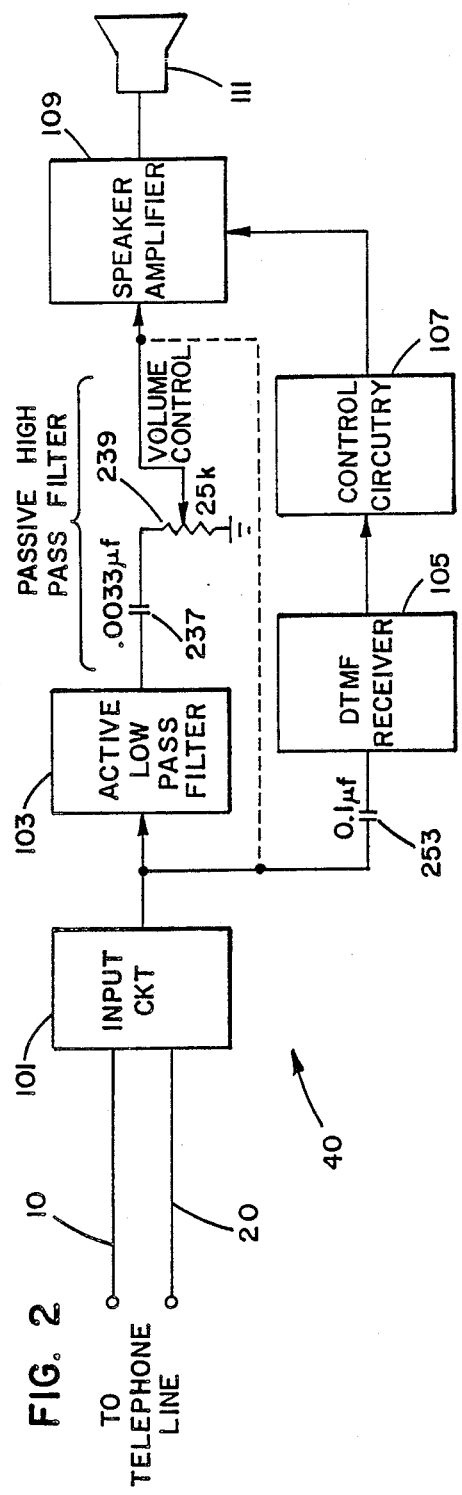
FIG. 2 is block diagram of the preferred embodiment of the present invention.

FIG. 2 is a block diagram showing the major functional portions of the preferred embodiment of the present invention. Upon reading and understanding this specification, those skilled in the art will see that there are alternate embodiments which may be substituted for the preferred embodiment without deviating from the scope and spirit of the present invention.

Announcement device 40 of FIG. 2 is connected to the tip 10 and ring 20 wires of the subscriber's telephone line. Input circuit 101 connects to the telephone line and provides for input amplification and telephone line isolation. The input circuit also provides a high impedance to the telephone line such that loading is minimized.

Input circuit 101 drives both an active low-pass filter circuit 103 and a DTMF receiver circuit 105. The DTMF receiver 105 is isolated from the input circuit through a 0.1 mf capacitor which serves to block DC and provide a small amount of high-pass filtering. The DTMF circuit is designed to continually monitor the tip and ring wires of the telephone line to detect the dual tone pair frequencies which correspond to the keys pressed on a standard DTMF touch pad. DTMF receiver 105 generates digital signals corresponding to the receipt of specific tone pairs corresponding, for example, to the star key or the octothorpe key on a standard telephone pad. In the preferred embodiment of the present invention, the star key is designed to activate the announcement device and the octothorpe key is designated to deactivate announcement device 40. In an alternate preferred embodiment, any key other than the star key will deactivate the unit. Also, if the user forgets to deactivate the announcement device, it will automatically power-down after approximately 70 seconds (as described below).

The active low-pass filter 103 is designed to filter out noise and other extraneous signals on the telephone line and only pass voice band signals to the speaker/amplifier circuit 109. As a result, it reduces the likelihood of audio feedback oscillation when a telephone 30 is too near an announcement device 40 while it is in the active mode. A 0.0033 mf capacitor and a 25 Kohm variable resistor comprise a passive high-pass filter to further limit low frequency noise such as switch hook noise. The 25 Kohm variable resistor also acts as a volume control for speaker/amplifier 109. Finally, a standard 8-ohm speaker 111 is connected to the output of speaker/amplifier 109 which then broadcasts the audio information taken from the telephone line to the localized area.

Control circuitry 107 shown in FIG. 2 and described in more detail below is used to operate the announcement device 40 and control its functions. In addition, control circuitry 107 has a time-out feature such that if a user fails to deactivate announcement device 40, the time-out feature will automatically deactivate it after, for example, 70 seconds. The control circuitry 107 will activate the announcement device in response to a star key being detected by DTMF receiver 105, as described above, and will deactivate the announcement device in response to any other key being detected by DTMF receiver 105, or alternatively by any key other than the star key.

Figure 3A:
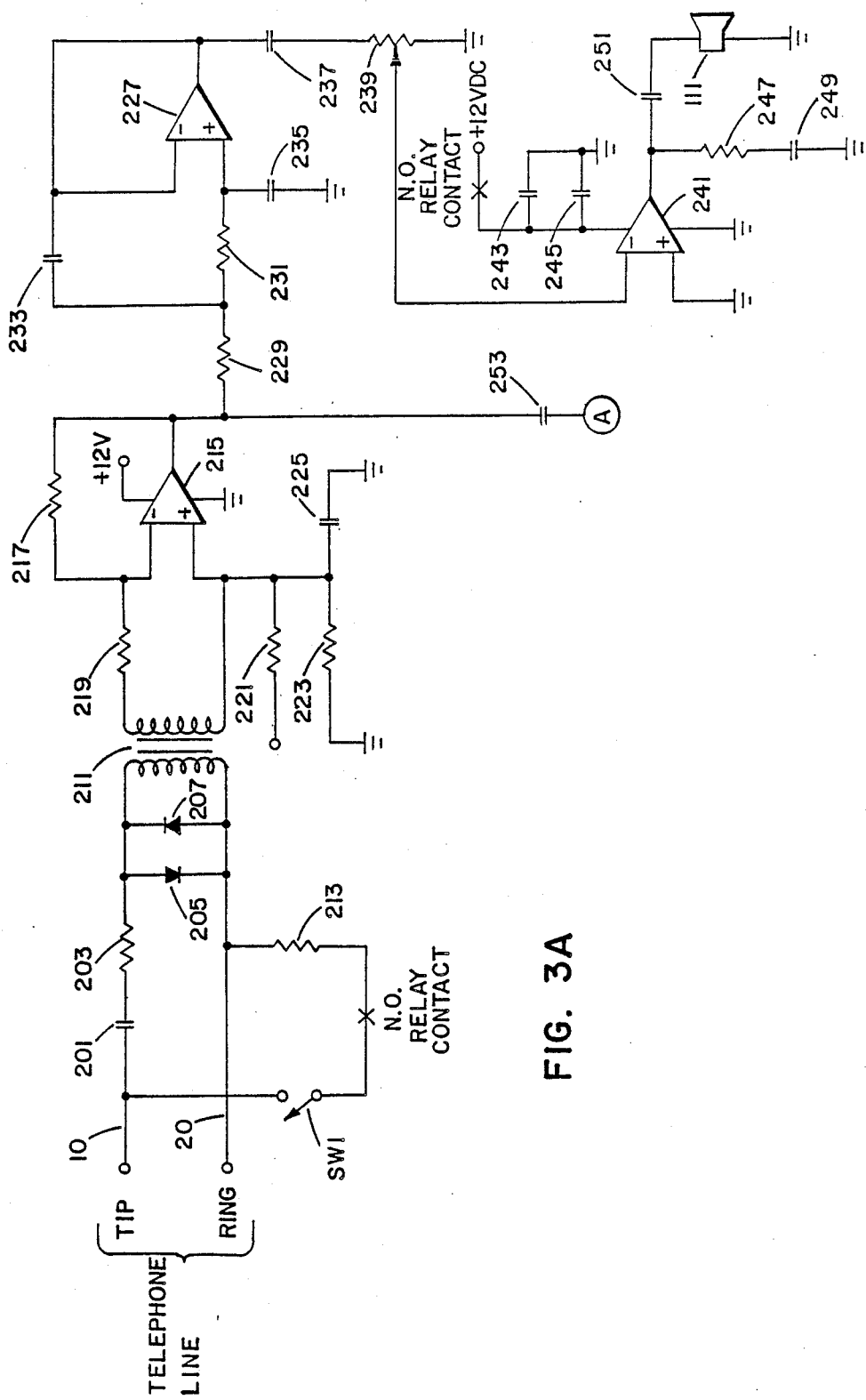
FIGS. 3a, 3b and 3c comprise the detailed electrical schematic diagram of the telephone announcement device.
Figure 3B:
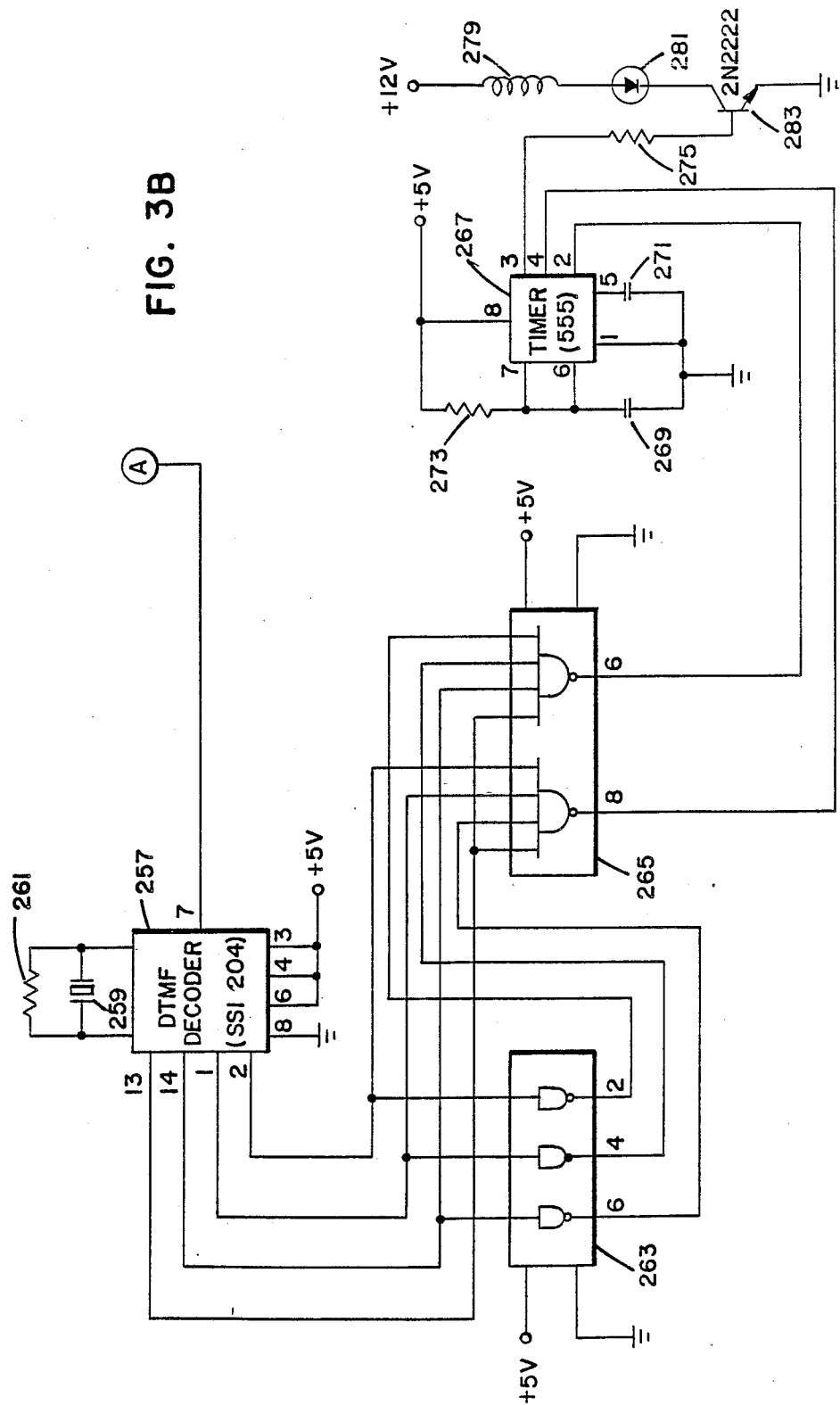

FIGS. 3a and 3b comprise the detailed electrical schematic diagrams and are intended to be viewed together. The tip 10 and ring 20 wires of the subscriber's telephone line are connected as shown in FIG. 3a. Line isolation is provided by 0.1 mf capacitor 201. Resistor 203 provides a high input impedance to signals passed through capacitor 201. General rectifier diodes 205 and 207 serve as input overvoltage protection. The input circuit also includes isolation transformer 211 which, in the preferred embodiment, has a one-to-one turn ratio with 10,000 ohms impedance in the audio frequency range. This type of isolation transformer is required by FCC Part 68 rules.

An optical circuit connected to the input line is a hold feature which may or may not be incorporated into the present invention. The operation of the hold feature is to place a fixed impedance across the telephone line to prevent the central office from disconnecting the telephone call when the switch hook on the subscriber's telephone is placed on hook. In this fashion, a subscriber could answer the telephone, perform an announcement through the announcement device 40 of the present invention, and hang up, with the announcement device keeping the line on hold as long as it is active. The incoming telephone call would not be dropped by the central office and the call could later be answered by picking up the switch hook of the same or another telephone connected to the telephone line. In the preferred embodiment shown in FIG. 3a, a load resistor 213 is placed across the tip 10 and ring 20 lines of the telephone line through switch SW1. The load impedance value is determined by normal telephone operational practices and FCC regulations. The HOLD feature is cancelled by the time-out feature of the present invention as discussed below. A normally-open relay contact connected in series with the load resistor 213 and switch SW1 ensures that the HOLD feature will not be activated longer than the announcement device is active (for example, 70 seconds). The relay contact is activated by relay coil 279. In this mode of operation only one of the paging devices, 40a, 40b, etc., should have SW1 in the closed position.

Also part of the input circuit is operational amplifier 215 which is in the preferred embodiment onehalf of an LM1458 operational amplifier pair available from National Semiconductor and other vendors. The secondary of isolation transformer 211 is connected between the inverting and noninverting inputs of operational amplifier 215, making the amplifier operate in a differential mode. Resistors 217 and 219, along with resistor 203, are selected in the preferred embodiment to provide a voltage gain of approximately one on operational amplifier 215, while providing high input impedance. Resistors 221 and 223 are shown with the appropriate values for biasing the gain of the operational amplifier and electrolytic bypass capacitor 225 is included for additional power supply filtering.

The output of operational amplifier 215 is driven both to the speaker/amplifier portion of the preferred embodiment of the present invention and also to a DTMF receiver circuit shown in FIG. 3b and discussed below. Operational amplifier 227 is the other half of operational amplifier pair circuit LM1458 described above. Operational amplifier 227 is arranged with the discrete components shown in FIG. 3a as an active low-pass filter for filtering out extraneous noise found on the telephone line. Capacitors 233 and 235 and resistors 231 and 229 select the 3 dB roll-off frequency to be approximately 3.4 kHz. Those skilled in the art will readily recognize that the selection of the roll-off frequency is a matter of design choice and has been selected in this application as an effective cut-off frequency to minimize feedback which may be associated by the close proximity of the announcement device 40 to a subscriber's telephone 30.

The output of operational amplifier 227 is thus a frequency limited audio output from the telephone line. The output of operational amplifier 227 is driven through capacitor 237 and variable resistor 239 which form a passive high-pass filter. Variable resistor 239 also serves as a volume control limiting the amount of signal from operational amplifier 227 from reaching audio amplifier 241.

Those skilled in the art will readily recognize that the use of operational amplifier 215 as an input buffer and the use of operational amplifier 227 as an input filtering device may be optional in the implementation of the preferred embodiment. The audio signals received from the telephone line are usually of sufficient magnitude and of sufficient frequency limiting to provide an acceptable audio signal for amplification. The features of input buffering by operational amplifier 215 and frequency limiting by operational amplifier 227 is offered to "clean up" the input audio signal and to improve the sound quality. These features, however, are not essential to the overall operation of the present invention, and the audio amplifier 241 (described below) may be attached directly to the telephone line or indirectly through the isolation transformer 211. This alternate connection is shown by the dashed line in FIG. 2.

Audio amplifier 241 is in the preferred embodiment an LM380 integrated circuit (available from National Semiconductor and other vendors) which incorporates a 5-watt audio power amplifier circuit. The audio input from volume control 239 drives the inverting input of audio power amplifier 241 while the noninverting input is grounded. Audio amplifier 241 is biased between +12 VDC and ground with the +12 VDC supply bus being bypassed by filter capacitors 243 and 245. The +12 VDC supply is switched through the normally open relay contact. Audio amplifier 241 is connected according to manufacturer's specifications for implementating an audio amplifier and thus has frequency limiting circuitry on its output comprised of resistor 247 and capacitor 249. The output of audio amplifier 241 is isolated from speaker 111 by large electrolytic capacitor 251. Speaker 111 is in the preferred embodiment an 8-ohm standard audio speaker.

The output of operational amplifier 215 is also directed to the DTMF sensing circuit shown in FIG. 3b and is isolated through isolation capacitor 253.

The star, octothorpe, and numeric keys on a standard keypad telephone produce standard DTMF tone pairs which are decoded by DTMF decoder chip 257. DTMF decoder chip 257 is in the preferred embodiment an SSI204 DTMF decoder available from Silicon Systems Incorporated. The operation of the SSI204 is described in trade literature and is frequency controlled by a 3.58 mHz reference crystal 259. Resistor 261 provides the appropriate oscillation impedance to maintain crystal 259 in oscillation. DTMF decoder chip 257 is capable of decoding all sixteen DTMF tone-pairs and producing a binary code corresponding to each tone pair.

The output of DTMF decoder chip 257 is 4-bit digital code corresponding to the key pressed on the DTMF transmitting telephone. Logic circuitry incorporated in the announcement device 40 and shown in FIG. 3b decodes this 4-bit digital code to only recognize the bit codes corresponding to the star and octothorpe keys on the DTMF pad. Thus, although decoder chip 257 is designed and implemented to decode all the keys on a standard DTMF pad (and the four keys not normally found on the pad), the logic circuitry contained in integrated circuits 263 and 265 decode only the 4-bit pairs corresponding to the star and octothorpe. Those skilled in the art will readily recognize that integrated circuit chip 263 (in the preferred embodiment a 7404 hex inverter chip) and integrated circuit chip 265 (a 7420 dual 4-input NAND gate) are arranged to implement a decoder.

Pin 6 of integrated circuit chip 265 will generate a logical 0 corresponding to DTMF decoder chip 257 recognizing the star key on the DTMF pad being pressed on any telephone connected to the telephone line at the subscriber's premises. Output pin 8 will provide a digital 0 whenever DTMF decoder chip 257 detects an octothorpe key being pressed on the keypad of any telephone connected to the subscriber's telephone line.

Pin 6 of integrated circuit chip 265 is connected to the trigger input (low active) of an LM555 monolithic timer chip available from National Semiconductor and other vendors. Output pin 8 of integrated circuit chip 265 (corresponding to the octothorpe key) is connected to the reset input (also low active) of the same LM555 monolithic timer chip 267. The discrete components 269, 271 and 273 are connected according to the manufacturer's specifications for selecting the time-out interval of monolithic timer 267. In the preferred embodiment of the present invention, a 70-second time-out period is selected. Thus, upon activation of the trigger input of monolithic timer 267, the control output of pin 3 will become activated and the timer 267 will count for approximately 70 seconds. At the end of the time interval selected by components 269, 271 and 273, the control output on pin 3 will become inactive. If at any time the reset input becomes active on monolithic timer 267, the control output on pin 3 will become inactive.

The control output on pin 3 of monolithic timer 267 drives the base of transistor 283 through an appropriate current limiting resistor 275. Transistor 283 serves to pull one side of relay coil 279 to ground, thus placing the relay coil between +12 VDC and ground upon activation of the control output of monolithic timer 267. As described above, relay coil 279 closes relay contacts 301 and 303, thus enabling the audio amplifier 241 and the HOLD feature activated through switch SW1. LED 281 is optional to show a visual indication of correct operation of the circuit.

Those skilled in the art will readily recognize that the time-out feature implemented with the LM555 monolithic timer 267 is not an essential component of the present invention. However, it is an advantageous feature because it provides for automatic deactivation of the device in the case where it is inadvertently activated by noise. Nonetheless, if the time-out feature is eliminated, the announcement device can be merely switched on or off by the keys on a DTMF touch tone pad of a telephone connected to the telephone line to which the announcement device is attached. Without the time-out feature, once the announcement device is enabled, it stays enabled until disabled by another mechanism, such as pressing another key on the DTMF pad of the telephone. In this embodiment, output pins 6 and 8 of integrated circuit 265 could be used to drive a flip-flop which in turn could be used to control transistor 283.

Figure 3C:
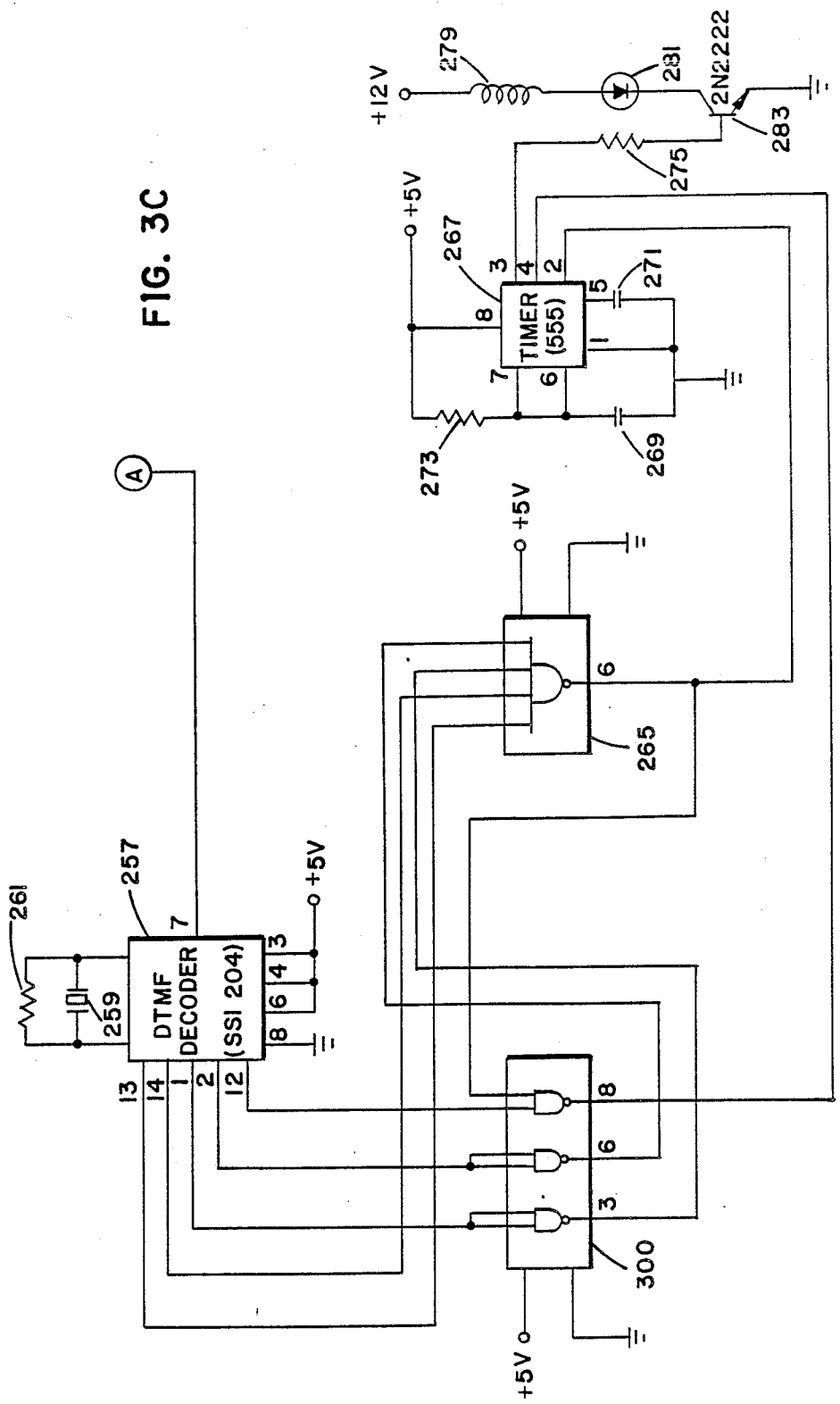

FIG. 3c shows an alternative control circuit to the one illustrated in FIG. 3b. Whereas the circuit in FIG. 3b causes the announcement unit to be activated with a star key and deactivated with an octothorpe key, the circuit in FIG. 3c causes the announcement unit to be deactivated with any DTMF key other than the star key. (The unit is still activated in this circuit by the star key.) The circuit in FIG. 3c is similar to the one in FIG. 3b except that the hex inverter circuit 263 is replaced by a quad 2-input NAND gate circuit 300 and some of the control connections have been changed. In particular, the reset input of the LM555 monolithic timer chip 267 is connected to the output pin 8 of the NAND gate circuit 300, which provides a digital 0 whenever DTMF decoder chip 257 detects any key depression other than a star key.

Figure 4:
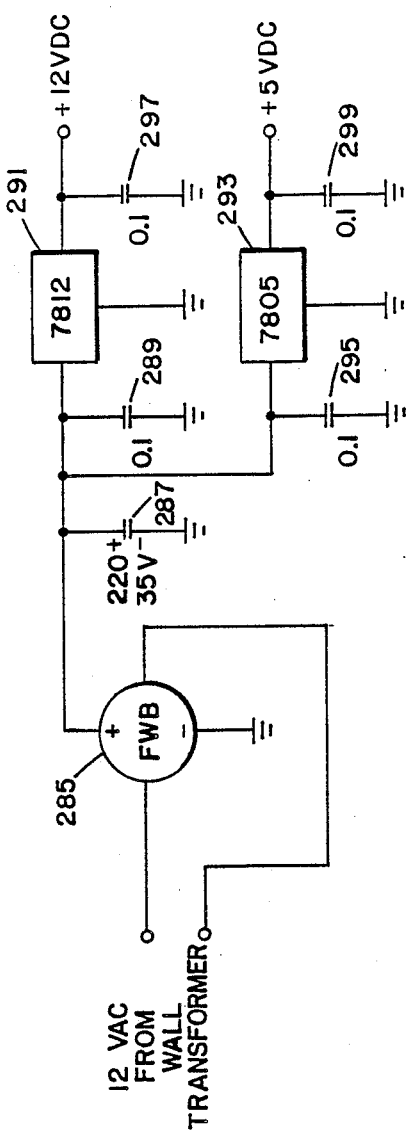
FIG. 4 shows a possible AC-to-DC power supply to power the present invention.

FIG. 4 shows a power supply circuit which may be used for the circuitry shown in FIGS. 3a and 3b. 12 VAC is obtained from a standard wall transformer (not shown) which drives the AC inputs to a full wave rectifier bridge 285. The negative side of full wave bridge 285 is grounded and the positive side is used to provide current to monolithic regulator chips 291 and 293. In the preferred embodiment discussed above, the circuitry of FIGS. 3a and 3b require alternately +12 VDC or +5 VDC. Monolithic regulator chip 291 is in the preferred embodiment an LM7812 regulator chip which will produce 12 VDC in a highly regulated fashion. In a like fashion, regulator chip 293 is in the preferred embodiment an LM7805 monolithic regulator which produces a very well regulated +5 VDC. Bypass capacitors 289, 297, 299 and 295 serve to limit switching noise on the regulated outputs. Electrolytic capacitor 287 serves to regulate the pulsed DC received from bridge 285.

Figure 5:
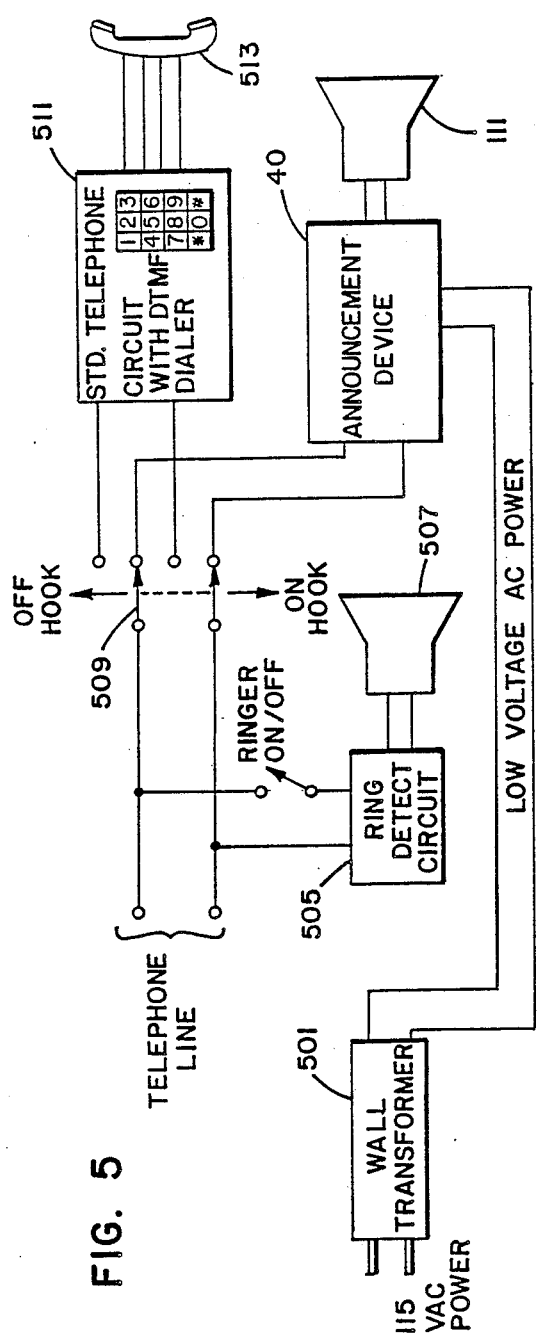
FIG. 5 discloses an optional embodiment wherein the announcement device is integrally designed into a telephone.

FIG. 5 shows an alternate embodiment of the present invention wherein announcement device 40 is integrally designed into telephone 30. By combining the announcement device 40 into a telephone, a combined feature phone would be constructed. As shown in FIG. 5, the tip and ring wires of the telephone line are supplied to the switch hook 509 of the telephone. Switch hook 509 contacts telephone announcement circuit 40 to the telephone line in its normal on-hook position. When the handset 513 is lifted and the telephone is placed off-hook, the switch hook 509 connects the standard telephone circuitry 511 to the telephone line and concurrently disconnects the telephone announcement circuit 40. Wall transformer 501 is shown connected to announcement device 40 which is in turn connected to audio output speaker 111.

A ring detect circuit 505 connected to the ringer speaker 507 performs the ring function of the telephone. In this embodiment, it is possible that the same speaker 111 could be used for both the ringer and the telephone announcement device.

While the present invention has been described in connection with the preferred embodiment thereof, it will be understood that many modifications will be readily apparent to those of ordinary skill in the art, and this application is intended to cover any adaptations or variations thereof. Therefore, it is manifestly intended that this invention be limited only by the claims and the equivalents thereof.

What is claimed is:

1. A self-contained telephone announcement device for transmitting baseband announcement information over only the tip and ring wires used by existing telephone equipment without modifying the connections between the telephone wires and without modifying the existing telephone equipment, comprising:

connection means for connecting to the tip and ring wires of a subscriber's telephone line in parallel to the subscriber's telephone equipment and independent of the subscriber's telephone equipment;

detector means attached to said connection means for monitoring the telephone line, for generating an ON signal in response to detecting a specific baseband DTMF tone pair on the telephone line and further for generating an OFF signal in response to detecting said baseband DTMF tone pair on the telephone line;

amplifier means attached to said connection means and said detector means for amplifying baseband audio signals placed on the telephone line by the subscriber's equipment, said amplifying being in response to said ON signal generated by said detector means; and a speaker attached to said amplifier means such that the amplified audio signals are output through said speaker.

2. The device according to claim 1 wherein said detector means further generates an OFF signal in response to detecting said DTMF tone pair on the telephone line and wherein said amplifier means turns off in response to said OFF signal generated by said detector means.

3. The device according to claim 2 wherein said ON signal is generated by said detector means in response to detecting a first DTMF tone pair and said OFF signal is generated in response to said detector means detecting a second DTMF tone pair.

4. The device according to claim 1 wherein said connection means further includes line isolation means for isolating the telephone announcement device from the telephone line.

5. The device according to claim 1 wherein said amplifier means further includes filtering means for removing extraneous noise from the audio signals received from said telephone line.

6. A method for announcing incoming telephone calls using only the tip and ring wires of an existing telephone line for use in parallel with a subscriber's existing telephone equipment, in response to placing a non-dialing standard baseband DTMF tone pair on the telephone line from the subscriber's existing telephone equipment, comprising the steps of:

(a) detecting the baseband DTMF tone pair directly from said telephone line;

(b) energizing an amplifier in response to detecting the baseband DTMF tone pair;

(c) amplifying baseband audio signals placed on the telephone line by the subscriber's equipment producing amplified audio signals; and (d) broadcasting the amplified audio signals through a speaker.

7. The method according to claim 6 further including the steps of:

(f) detecting the non-hyphen dialing standard DTMF tone pair; and (g) de-energizing the amplifier.

8. A baseband telephone announcement apparatus for connection to a standard subscriber's telephone line to which is also connected in parallel a standard touch pad telephone, comprising:

input means connected to the telephone line in parallel with the standard touch pad telephone for receiving baseband audio signals placed on the telephone line by the standard touch pad telephone;

receiver means connected to said input means for detecting baseband DTMF tone pairs on the telephone line generated by the standard touch pad telephone;

control means connected to said receiver means for generating an ON signal in response to said receiver means detecting a baseband DTMF tone pair on said telephone line;

filter means connected to said input means and said control means for receiving and filtering said baseband audio signals from the telephone line and for producing therefrom filtered amplified audio signals in response to said ON signal; and a speaker connected to said filter means such that said filtered amplified audio signals are broadcast.

9. The apparatus according to claim 8 wherein said control means further generates an OFF signal in response to said receiver means detecting a non-dialing standard DTMF tone pair wherein said amplifier means is de-energized in response to said OFF signal.

10. The apparatus according to claim 8 wherein said filter means includes a low-pass filter for limiting noise audio feedback in said signals.

* * * * *